United States Patent
Tang et al.

(10) Patent No.: US 9,287,924 B2
(45) Date of Patent: Mar. 15, 2016

(54) METHOD, APPARATUS, RECEIVER, COMPUTER PROGRAM AND STORAGE MEDIUM FOR JOINT DETECTION

(75) Inventors: Zhixun Tang, Beijing (CN); Xie Li, Beijing (CN); Liping Zhang, Beijing (CN); Daijun Zhang, Beijing (CN)

(73) Assignee: ST-ERICSSON SA, Plan-les-Ouates (CH)

( * ) Notice: Subject to any disclaimer, the term of this patent is extended or adjusted under 35 U.S.C. 154(b) by 104 days.

(21) Appl. No.: 14/345,414

(22) PCT Filed: Sep. 20, 2011

(86) PCT No.: PCT/CN2011/079876
§ 371 (c)(1),
(2), (4) Date: Mar. 18, 2014

(87) PCT Pub. No.: WO2013/040754
PCT Pub. Date: Mar. 28, 2013

(65) Prior Publication Data
US 2014/0348136 A1  Nov. 27, 2014

(51) Int. Cl.
*H04B 1/12* (2006.01)
*H04B 1/7105* (2011.01)
*H04B 1/7107* (2011.01)

(52) U.S. Cl.
CPC ............ *H04B 1/7105* (2013.01); *H04B 1/7107* (2013.01); *H04B 2201/70702* (2013.01)

(58) Field of Classification Search
CPC ...... H04B 1/12; H04B 1/7105; H04B 1/7107; H04L 27/3809
USPC ................................ 370/320, 335; 375/152
See application file for complete search history.

(56) References Cited

U.S. PATENT DOCUMENTS 6,778,592 B1 *  8/2004  Haga et al. ..................... 375/148
7,656,936 B2 *  2/2010  Li et al. .......................... 375/148
(Continued)

FOREIGN PATENT DOCUMENTS

| CN | 1980090 A | 6/2007 |
| CN | 101056120 A | 10/2007 |
| CN | 102025392 A | 4/2011 |

(Continued)

OTHER PUBLICATIONS

Misra et al., "A Computationally Efficient Hybrid of Joint Detection and Successive Interference Cancellation," Connecting the Mobile World: Proceedings / IEEE VTS 53rd Vehicular Technology Conference, Spring, 2001 (IEEE Vehicular Technology Conference, vol. 3, pp. 1784-1788, May 6, 2001, Rhodes, Greece.

*Primary Examiner* — Wanda Z Russell
(74) *Attorney, Agent, or Firm* — Coats & Bennett, PLLC (57) ABSTRACT

A method, apparatus, receiver, computer program and storage medium for joint detection are disclosed. The joint detection method includes categorizing interference signals based on level of interference so as to obtain a strong interference signal, cancelling the strong interference signal from a received signal, and performing a joint detection by utilizing a matched filtering result of a remaining signal. In one embodiment, it is to firstly determine whether a strong interference codes corresponding to an intra-frequency adjacent cell exists in an active code list or not, recovering a strong interference signal transmitted by a Node B if the strong interference codes exists, applying an interference cancellation to a received signal received by a receiver so as to obtain a matched filtering result of a remaining signal derived by subtracting the strong interference signal from the received signal, performing a joint detection by utilizing the matched filtering result of the remaining signal, and outputting a demodulated result. In at least one embodiment, the computation complexity of the joint detection is reduced, and the accuracy of the joint detection is improved.

18 Claims, 6 Drawing Sheets

(56) References Cited

U.S. PATENT DOCUMENTS

| | | | |
|---|---|---|---|
| 2009/0010228 A1* | 1/2009 | Wang et al. | 370/335 |
| 2009/0161745 A1* | 6/2009 | Pedersen et al. | 375/227 |
| 2011/0003552 A1* | 1/2011 | Sun et al. | 455/63.1 |
| 2013/0287087 A1 | 10/2013 | Tang et al. | |
| 2014/0112250 A1* | 4/2014 | Bahrenburg | 370/328 |

FOREIGN PATENT DOCUMENTS

| | | |
|---|---|---|
| EP | 1793518 A1 | 6/2007 |
| WO | 2006064389 A2 | 6/2006 |

* cited by examiner

METHOD, APPARATUS, RECEIVER, COMPUTER PROGRAM AND STORAGE MEDIUM FOR JOINT DETECTION

FIELD OF THE INVENTION

The present invention relates to a wireless communication field, specially relates to a method, apparatus, receiver, computer program and storage medium for joint detection applied to Code Division Multiple Access (CDMA).

BACKGROUND OF THE INVENTION

In a Direct Sequence-Code Division Multiple Access (DS-CDMA) system, since different signals have different propagation time delays and scramble code exists when using CDMA technique, spreading code used by respective signals are not completely orthogonal at reception. Interference caused by non-zero correlation coefficient is referred to as Multiple Access Interference (MAI). A Matched Filter (MF) or a Multi-user Detector (MUD) is commonly used to recover a signal without spreading and scrambling. A conventional matched filter may not efficiently suppress MAI. Multi-user detection may properly cancel the effect of MAI.

In the DS-CDMA system, a MUD may employ a Joint Detector (JD) method.

In a TD-SCDMA system, a Zero-Forcing (ZF) algorithm or a Minimum Mean Square Error (MMSE) algorithm is used for joint detection, the demodulated result thereof are as following:

$$\hat{d}_{ZF}=(A^HA)^{-1}A^HAd+(A^HA)^{-1}A^Hn$$

$$\hat{d}_{MMSE}=(A^HA+\sigma^2I)^{-1}A^HAd+(A^HA+\sigma^2I)^{-1}A^Hn$$

Where, A represents a system matrix which is determined according to the spreading code and channel impulse responses of all user, d represents a transmit signal, n represents a noise signal, I represents a unit matrix, $\sigma^2$ represents the power of the noise signal.

Since A corresponds to a received signal including all interference signals, A has a large number of matrix dimensions and the joint detection may need a large amount of computation. When there is a strong interference signal, the detection result is typically not accurate.

SUMMARY OF THE INVENTION

Embodiments of the present invention disclose a method, apparatus, receiver, computer program and storage medium for joint detection. In the embodiments, when a strong interference signal exists, an interference cancellation is applied to a received signal, MAI caused by the strong interference signal is cancelled. A matched filtering result of the signal after the interference cancellation is used for the joint detection. Therefore, the computation complexity of the joint detection is decreased and the accuracy of the joint detection is improved.

In some embodiments of the present invention, a power of code after a matched filtering is directly used to determine the strong interference code. Therefore, the strong interference code may be accurately determined.

In some embodiments of the present invention, since power of channel impulse response windows has been obtained at the stage of channel estimation, the power of windows in the channel estimation result may be used to determine the strong interference codes. Therefore, computation resource consumed to determine the strong interference code may be decreased.

In some embodiments of the present invention, a matched filtering result of a remaining signal may be calculated by the following steps: calculating the remaining signal firstly, matched filtering the remaining signal, and obtaining the matched filtering result of the remaining signal. The existing hardware unit for the matched filtering may be reused in the above method, thus hardware cost is low.

In some embodiments of the present invention, the matched filtering result of the remaining signal may be calculated by the following steps: calculating a product of a conjugate transpose matrix of a system matrix of the remaining signal, a system matrix of a strong interference signal and the strong interference signal; and subtracting the product from the remaining part acquired by cancelling a part of a matched filtering result of a received signal corresponding to the strong interference signal from the matched filtering result of the received signal, so as to obtain the matched filtering result of the remaining signal. This method adopts an operation at symbol level. Therefore, the computation complexity is relatively low.

It is obvious that the present invention is not limited to the above features and advantages. A person skilled in the art will understand other features and advantages by reading the detail description of the preferred embodiments in conjunction with the accompanying figures.

DETAILED DESCRIPTION OF THE PREFERRED EMBODIMENTS

In the method, device and receiver for a joint detection in embodiments of the present invention, interference signals are categorized based on the level of interference so as to obtain a first system matrix corresponding to strong interference signals and a second system matrix corresponding to signals including a weak interference signal and a (local user signal). An interference cancellation is carried out according to the two system matrix, a received signal which also includes strong interference signals to cancel the strong interference signal from the received signal. Since the matched filtering result of the signal after cancelling the strong interference signal is used for the joint detection, the computation complexity of the joint detection is decreased and the accuracy of the joint detection is improved.

In order to better understand the present invention, some basic concepts related to the embodiments are firstly explained as following:

e indicates a received signal including a useful signal, an interference signals and a noise signal;

the interference signals may be categorized into a strong interference signal d2 and a weak interference signal based on a criterion that whether a ratio of the maximum power in a user window of an interference user in an intra-frequency adjacent cell to the maximum power in a user window of an local user is beyond a predefined threshold or not, or whether a ratio of a power of code of the intra-frequency adjacent cell to the corresponding power of code of the local user is beyond a predefined threshold or not, wherein, d2 represents the transmit signal of intra-frequency adjacent cell causing the strong interference, which corresponds to the system matrix $A_2$;

d1 represents a signal of the local cell and the signals of intra-frequency adjacent cell causing the weak interference, which correspond to the system matrix $A_1$;

n represents a noise signal.

The received signal of a receiver e is shown as following:

$$e = A_1 d_1 + A_2 d_2 + n \quad \text{Function (1)}$$

Function (1) may be rewritten to the following matrix:

$$e = [A_1 \ A_2] \begin{bmatrix} d_1 \\ d_2 \end{bmatrix} + n \quad \text{Function (2)}$$

A Matched filter $[A_1 \ A_2]^H$ is applied to the above received signal and the following function is obtained:

$$[A_1 \ A_2]^H e = [A_1 \ A_2]^H [A_1 \ A_2] \begin{bmatrix} d_1 \\ d_2 \end{bmatrix} + [A_1 \ A_2]^H n \quad \text{Function (3)}$$

wherein, superscript H represents a conjugate transpose.

Functions (4), (5) and (6) are obtained successively based on function (3):

$$[A_1 \ A_2]^H e = \begin{bmatrix} A_1^H A_1 & A_1^H A_2 \\ A_2^H A_1 & A_2^H A_2 \end{bmatrix} \begin{bmatrix} d_1 \\ d_2 \end{bmatrix} + [A_1 \ A_2]^H n \quad \text{Function (4)}$$

$$[A_1 \ A_2]^H e - \begin{bmatrix} A_1^H A_1 & A_1^H A_2 \\ A_2^H A_1 & A_2^H A_2 \end{bmatrix} \begin{bmatrix} 0 \\ d_2 \end{bmatrix} = \quad \text{Function (5)}$$

$$\begin{bmatrix} A_1^H A_1 & A_1^H A_2 \\ A_2^H A_1 & A_2^H A_2 \end{bmatrix} \begin{bmatrix} d_1 \\ 0 \end{bmatrix} +$$

$$[A_1 \ A_2]^H n$$

$$[A_1 \ A_2]^H e - \begin{bmatrix} A_1^H A_2 \\ A_2^H A_2 \end{bmatrix} [d_2] = \begin{bmatrix} A_1^H A_1 \\ A_2^H A_1 \end{bmatrix} [d_1] + [A_1 \ A_2]^H n \quad \text{Function (6)}$$

The Function (6) can be decomposed into two functions, i.e., function (6.1) and function (6.2) as below:

$$A_1^H e - [A_1^H A_2][d_2] = [A_1^H A_1][d_1] + A_1^H n \quad \text{Function (6.1)}$$

$$A_2^H e - [A_2^H A_2][d_2] = [A_2^H A_1][d_1] + A_2^H n \quad \text{Function (6.2)}$$

In embodiments of the present invention, data finally used for the joint detection is a matched filtering result of the weak interference signal, the local user signal and the noise signal. Since the system matrix corresponding to $d_1$ and n is $A_1$, function (6.1) is selected for JD other than function (6.2). In other words, the right part of function (6.1) represents the matched filtering result, so function (6.1) is selected other than function (6.2).

Therefore, if $A_1$, $A_2$, e, $d_2$ are known, $[A_1^H A_1][d_1] + A_1^H n$ may be obtained based on Function (6.1).

In the embodiment of the present invention, in the case of $[A_1^H A_1][d_1] + A_1^H n$, the ZF algorithm or the MMSE algorithm is used to joint detect a signal only including a useful signal and a weak interference signal, so as to obtain the demodulated signals as follows:

$$\hat{d}_{ZF} = (A_1^H A_1)^{-1}(A_1^H A_1 d_1 + A_1^H n) \quad \text{Function (7)}$$

$$\hat{d}_{MMSE} = (A_1^H A_1 + \sigma^2 I)^{-1}(A_1^H A_1 d_1 + A_1^H n) \quad \text{Function (8)}$$

In related art, since the signal under the joint detection includes all received signals; the performance will be significantly decreased when the power of the intra-frequency adjacent cell is large. Meanwhile, since the conventional joint detection is performed in consideration of all signals, the number of matrix dimensions is lager, and thus the amount of computation is large. On the contrary, in the embodiment of the present invention, the matched filtering result of the signal after cancelling the strong interference signal (only including a useful signal, a weak interference signal and a noise signal) is used for the joint detection. The accuracy of the joint detection is increased. The number of matrix dimensions is decreased and thus the amount of computation is decreased.

Therefore, it is necessary to obtain the signal only including the useful signal, the weak interference signal and the noise signal to decrease the computation complexity and increase the accuracy of the joint detection. That is, the strong interference signal should be cancelled before implementing the joint detection.

Figure 1:
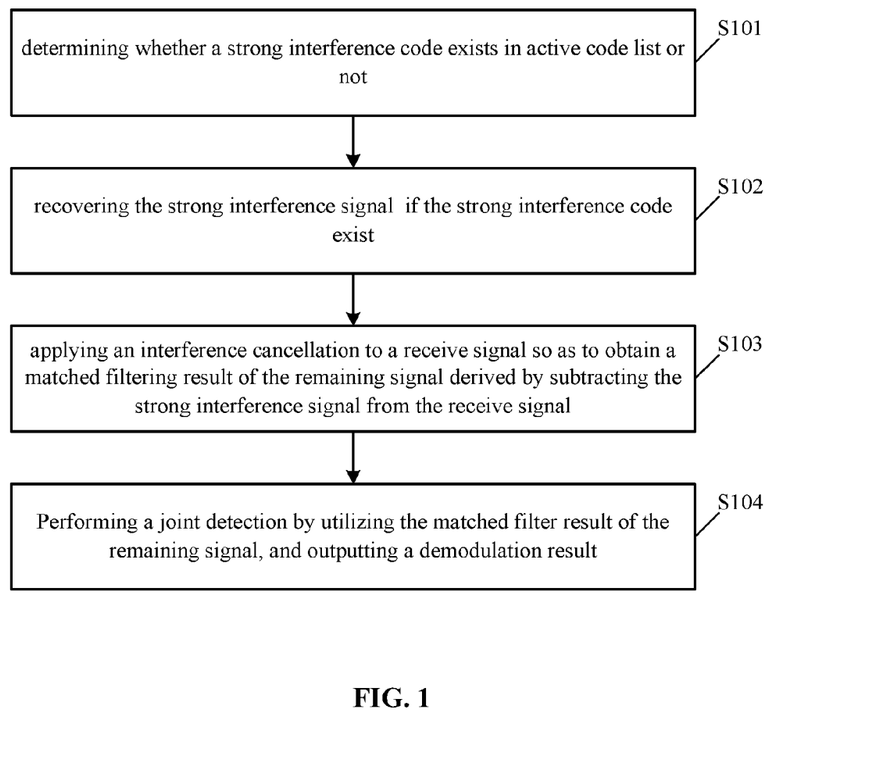
FIG. 1 shows a schematic flow chart of a joint detection method according to an embodiment of the present invention.

FIG. 1 shows a joint detection method for a Direct Sequence-Code Division Multiple Access device according to an embodiment of the present invention. The joint detection method includes the following steps:

Step S101, determining whether strong interference code of an intra-frequency adjacent cell of a servicing cell of the device (or local user) exist in an active code list or not, wherein the determination comprises determining if a ratio of a power of the strong interference code to a power of an active code of the local user (the device) is beyond a predefined threshold. The active code list is determined according to the configuration of the joint detection.

Step S102, recovering a strong interference signal transmitted by a Node B corresponding to the strong interference code, if the strong interference code exists;

Step S103, applying an interference cancellation to a received signal received by UE, and obtaining a matched filtering result of a remaining signal derived by cancelling the strong interference signal from the received signal; and Step S104, utilizing the matched filter result of the remaining signal for the joint detection, and outputting a demodulated result.

A joint detection device according to an embodiment of the present invention includes one or more modules, which are configured to implement the following functions:

determining whether a strong interference code corresponding to an intra-frequency adjacent cell of the servicing cell of the local user exists in active code list or not, wherein a ratio of a power of the strong interference code to a power of active codes of the local user is beyond a predefined threshold;

recovering a strong interference signal transmitted by a Node B if the strong interference codes exists;

applying an interference cancellation to a received signal, and obtaining a matched filtering result of a remaining signal derived by cancelling the strong interference signal from the received signal;

performing a joint detection by utilizing a matched filtering result of the remaining signal, and outputting a demodulated result.

Figure 2:
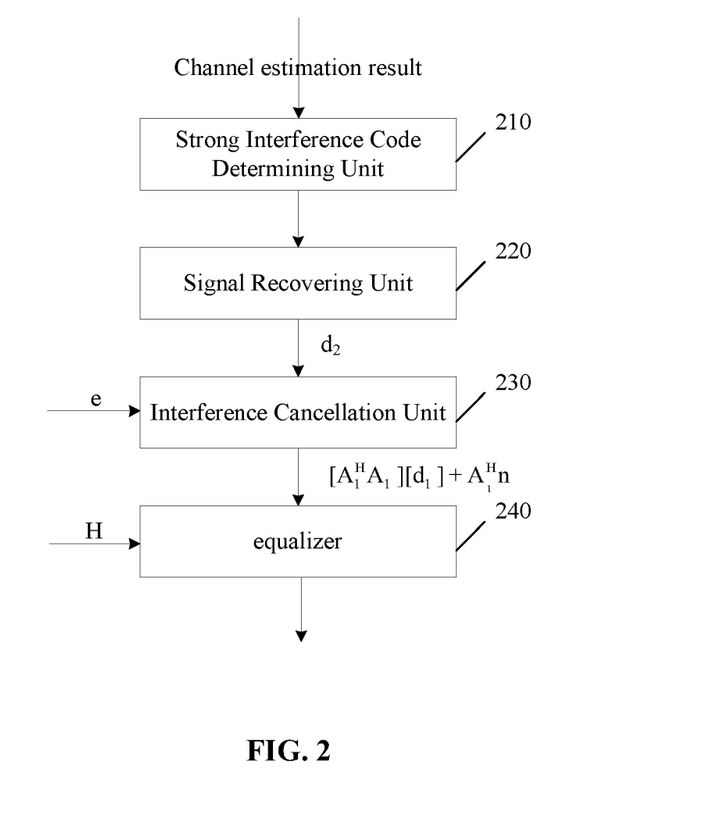
FIG. 2 shows a diagram illuminating a schematic configuration of a joint detection device according to an embodiment of the present invention.

FIG. 2 is a schematic diagram showing the configuration of a joint detection device according to an embodiment of the present invention. The joint detection device includes:

a strong interference code determine unit 210 configured to determine whether strong interference codes corresponding to an intra-frequency adjacent cell of a servicing cell of an local user exist in active code list or not, wherein a ratio of a power of the strong interference codes to a power of an active code of the local user is beyond a predefined threshold;

a signal recovering unit 220 configured to recover a strong interference signal transmitted by a Node B, if the strong interference codes exists;

an interference cancellation unit 230 configured to apply an interference cancellation to a received signal by cancelling the strong interference signal from the received signal to obtain a remaining signal, and obtaining a matched filtering result of the remaining signal; and an equalizer 240 configured to utilize the matched filtering result of the remaining signal for a joint detection, and to output a demodulated result.

An embodiment of the present invention also includes a receiver employing the joint detection device as mentioned above.

With the joint detection method and the joint detection device according to the embodiments of the present invention, one or more of the following advantages can be achieved:

1) data finally used for the joint detection do not contain data of the strong interference signal, and thus the demodulated result of the joint detection is more accurate;

2) the data finally used for the joint detection do not contain data related to the strong interference signal, but data related to the weak interference signal, the useful signal and the noise signal, and thus the number of matrix dimensions of the matched filtering result of the remaining signal is less than that of the matched filter result of the signal which includes the strong interference signal, the weak interference signal, the useful signal and the noise signal, thereby, the computation complexity of the joint detection decreases.

In an embodiment of the present invention, the strong interference codes determining unit determines whether the strong interference codes exists in the active code list or not. If yes, the strong interference codes determine unit further determines a index of the strong interference codes so as to determine the system matrix corresponding to the strong interference codes. Several possible methods for the determination are discussed in detail as below.

<Implementation 1>

In implementation 1, the power of codes is directly used for the determination.

The power of the active codes can be obtained after matched filtering the received signal.

In the implement 1, the power corresponding to the above active codes of the local user (i.e., predefined reference power) is:

average power of all active codes of the local user;
the maximum power of all active codes of the local user, or power of anyone of all active codes of the local user.

After determining the power corresponding to the active codes of the local user, the active code from intra-frequency adjacent cells is determined from the active code list, and it is determined that whether the ratio of the power of each codes to the predefined reference power is beyond a predefined threshold. If yes, the codes is determined to be the strong interference codes, otherwise the codes is not determined as the strong interference codes.

<Implementation 2>

In the implementation 1, the power of code is directly used for the determination. However, in an embodiment of the present invention, a power of channel impulse response window obtained in the stage of the channel estimation is used for the determination, which will be discussed in detail as below.

In an embodiment of the invention, a window is referred to channel impulse response window corresponding to a user.

For example, in the TD-SCDMA system, an effective length of the Midamble is 128 chips. Assuming all users who belong to the system employs the same time slot and the value of Kcell (number of users) is 8, then the channel impulse response window length W is 16. Based on channel estimations, a value of impulse response of each path within the channel impulse response window can be obtained.

Figure 3:
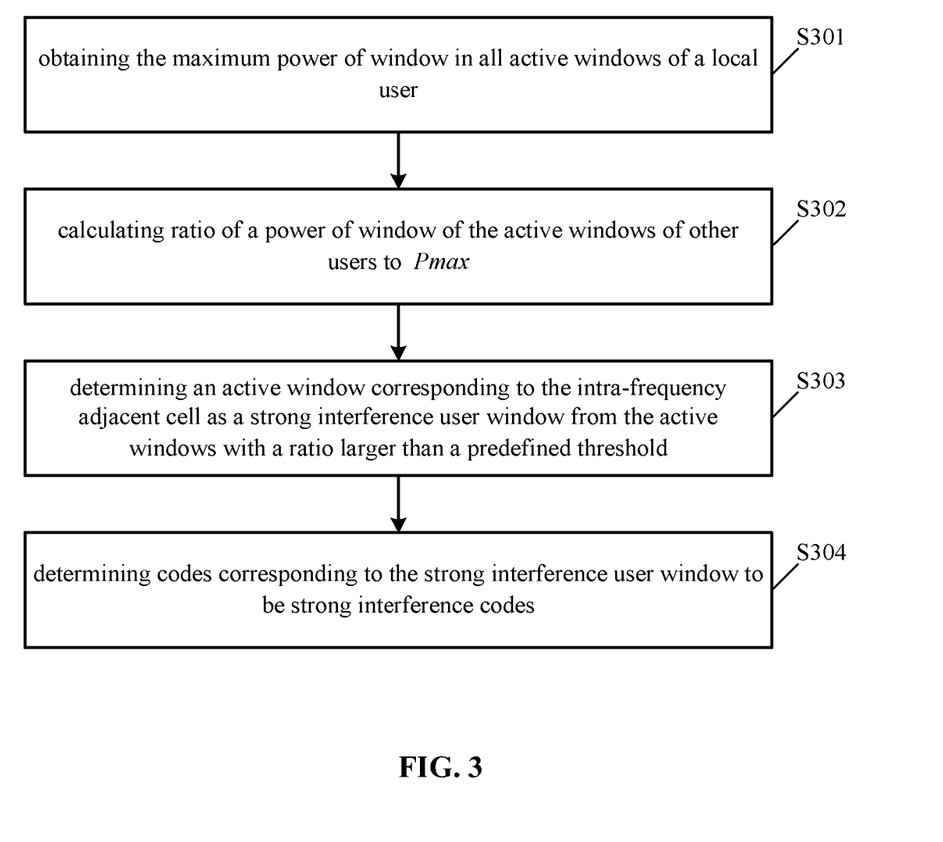
FIG. 3 shows a schematic flow chart describing an implementation of determining strong interference codes according to an embodiment of the present invention.

Since each window corresponds to at least one codes, when the power of the window is large, the corresponding power of the codes is large. Therefore, the ratio of a power between windows may be used to indirectly determine the ratio of a power between the codes. That is, the power of windows is used to represent the power of the codes. As shown in FIG. 3, a method using the power of window to determine the strong interference codes includes the following steps:

Step S301, obtaining the maximum power of window $p_{max}$ in all active windows of the local user;

Step S302, calculating a ratio of a power of window of each active window of other users to $p_{max}$;

Step 303, determining the active window corresponding to the intra-frequency adjacent cell as the strong interference user window from the active windows with a ratio larger than a predefined threshold; and Step S304, determining the code corresponding to the strong interference user window as the strong interference codes.

As mentioned above, a precondition of the strong interference cancellation is to demodulate the strong interference signal d2. In an embodiment of the present invention, there are various methods to determine whether the strong interference signal may be demodulated or not. One of the methods discussed here is to utilize power of a cell for the determination.

When a cell has strong power and other cells have relatively weak power, MAI of other cells to the cell may be ignored. The strong interference codes in the cell may be correctly determined after matched filtering. Based on the above concept, in an embodiment of the present invention, the ratio of the average power of the cell in which the strong interference window is located to the average power of a cell which is adjacent to the cell in which the strong interference is located is used to determine whether the strong interference signal can be demodulated or not. When the ratio of the power of the cell in which the strong interference codes is located to the power of the cell which is adjacent to the cell in which the strong interference codes is located is larger than a predefined threshold, it is determined that the strong interference signal can be demodulated. Otherwise, it is determined that the strong interference signal can not be demodulated. After it is determined that the strong interference signal can be demodulated, the process proceeds to step S102, otherwise a known method may be directly used for the joint detection.

In an embodiment of the present invention, when the strong interference codes exists, the received signal and the system matrix corresponding to the strong interference codes are used to calculate the strong interference signal d2 as following.

After the channel estimation, the system matrix A can be constructed based on information on the active windows:

$$A = \begin{bmatrix} B & & 0 \\ & B & \\ & & B \\ 0 & & B \end{bmatrix}$$

Where, the system submatrix B is shown as following:

$$B = \begin{bmatrix} b_1^{(1)} & b_1^{(2)} & \cdots & b_1^{(K)} \\ b_2^{(1)} & b_2^{(2)} & \cdots & b_2^{(K)} \\ \vdots & \vdots & \cdots & \vdots \\ b_Q^{(1)} & b_Q^{(2)} & \cdots & b_Q^{(K)} \\ b_{Q+1}^{(1)} & b_{Q+1}^{(2)} & \cdots & b_{Q+1}^{(K)} \\ \vdots & \vdots & \cdots & \vdots \\ b_{Q+W-1}^{(1)} & b_{Q+W-1}^{(2)} & \cdots & b_{Q+W-1}^{(K)} \end{bmatrix}$$

Where, the column vector $b^{(k)}$ corresponding to the kth codes is shown as following:

$$b^{(k)} = [b_1^{(k)}, b_2^{(k)} \ldots b_{Q+W-1}^{(k)}]' = v^{(k)} * h^{(k)} \quad k = 1, \ldots, K$$

where, $v^{(k)}$ is dot product of a spreading code and a scrambling code;

$h^{(k)}$ is the channel estimation corresponding to the active spreading code;

K is the number of the codes;

W is the length of a system impulse response window;

Q is a system spreading factor.

After the strong interference codes is determined, the column vectors corresponding to the strong interference codes are selected from the system submatrix B to compose the system submatrix $B_2$ corresponding to the strong interference signal. The remaining column vectors can compose the system submatrix $B_1$ corresponding to the useful signal and the weak interference signal.

After the system matrix $B_2$ is determined, the system matrix $A_2$ corresponding to the strong interference signal and the system matrix $A_1$ corresponding to the weak interference signal and the useful signal can be constructed.

After the system matrix $A_2$ is determined, a soft output of the strong interference signal is calculated as following:

$$\hat{d}_2 = A_2^H e$$

Of course, $A_2^H e$ may be selected directly from the matched filtering result of the received signal e.

A hard decision is applied to the soft output of the strong interference signal to recover the strong interference signal:

$$d_2 = Q(\hat{d}_2)$$

In an embodiment of the present invention, the interference cancellation is applied to the received signal. The matched filtering result of the remaining signal is obtained by subtracting the strong interference signal from the received signal, i.e., by calculating according to $A_1^H e - [A_1^H A_2][d_2]$.

When $A_1$, $A_2$ and e are determined, various methods may be used to calculate $A_1^H e - [A_1^H A_2][d_2]$.

In a first method, it is to firstly calculate $e - A_2 d_2$, apply the matched filtering to $e - A_2 d_2$ with $A_1$ and obtain $A_1^H e - [A_1^H A_2][d_2]$.

In a second method, it is to calculate $A_1^H e$ and $[A_1^H A_2][d_2]$ respectively, and then subtract $[A_1^H A_2][d_2]$ from $A_1^H e$ to obtain $A_1^H e - [A_1^H A_2][d_2]$.

The detail processes of the two methods are explained as following.

Figure 4:
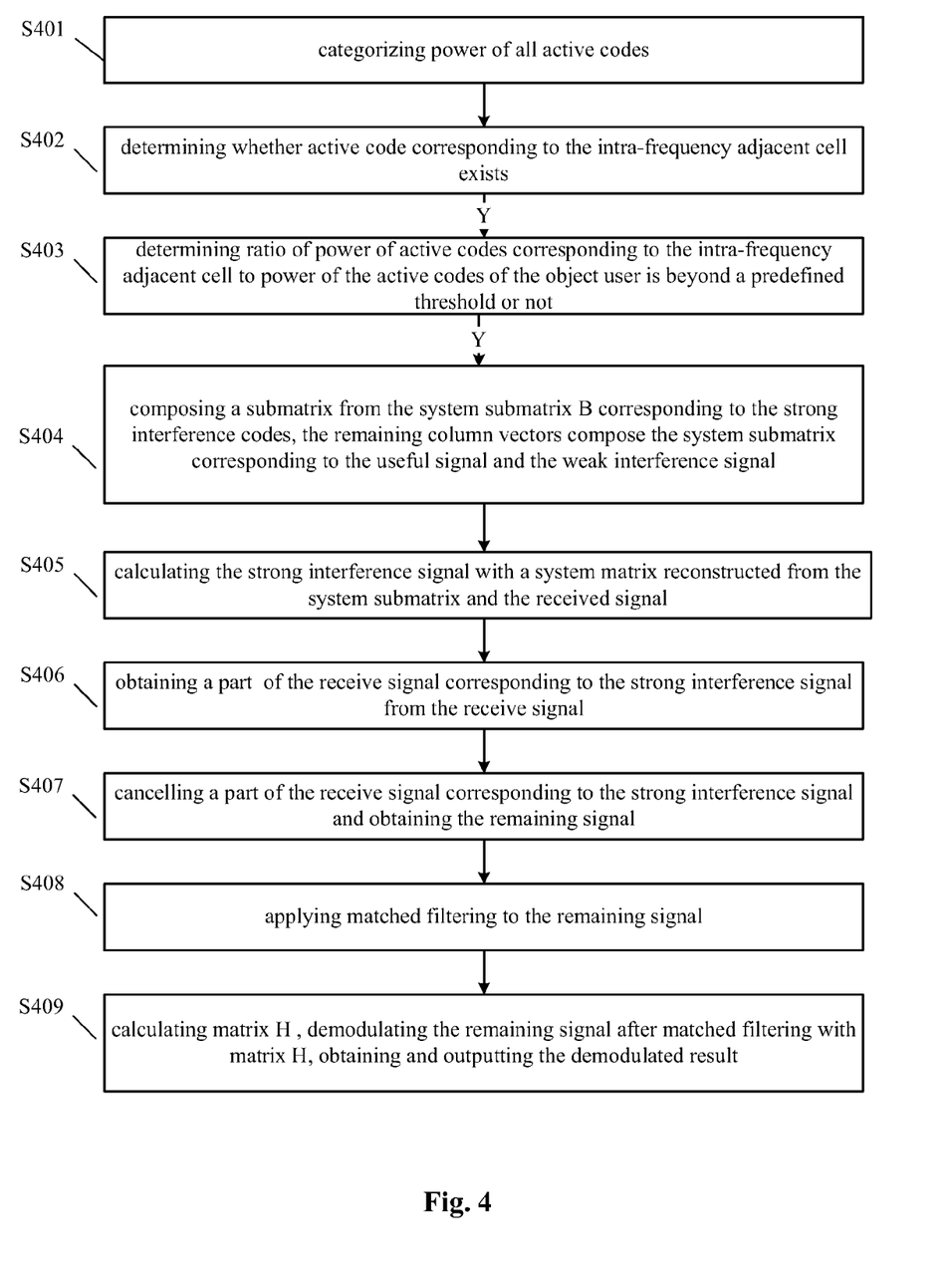
FIG. 4 shows a detail flow chart for calculating a matched filtering result of the remaining signal according to an embodiment of the present invention.

As shown in FIG. 4, in the first method, the joint detection method according to an embodiment of the present invention includes the following steps:

Step S401, sequencing power of all active codes by utilizing information on the active windows in the channel estimation;

Step S402, determining whether active codes corresponding to the intra-frequency adjacent cell exists in the active code list or not, if yes, the first method proceeds to step S403, otherwise, the first method ends and the process proceeds to the existing joint detection procedure;

Step S403, determining whether the ratio of the power of the active codes corresponding to the intra-frequency adjacent cell to the power of the active codes of the local user is beyond a predefined threshold or not, if yes, the strong interference codes exists and the process proceeds to step S404, otherwise the first method ends and the process proceeds to the existing joint detection procedure;

Step S404, determining an index of the strong interference codes, selecting column vectors corresponding to the strong interference codes to compose the submatrix $B_2$ from the system submatrix B (corresponding to the received signal e) generated from the channel estimation result. The remaining column vectors compose the system submatrix $B_1$ corresponding to the useful signal and the weak interference signal;

Step S405, calculating the strong interference signal $d_2 = Q(A_2^H e)$ with the system matrix $A_2$ reconstructed from the system submatrix $B_2$ and the received signal e, wherein Q represents a quantitative operation, i.e., a hard decision processing, which mapping the soft output result $A_2^H e$ to modulated standard constellation points, for example, to the standard constellation points of QPSK. $A_2^H e$ can be obtained by a direct calculation, or can be selected from the matched filtering result of the received signal e according to the determination result of the strong interference codes;

Step S406, obtaining a part of the received signal $A_2 d_2$ corresponding to the strong interference signal;

Step S407, canceling the part $A_2 d_2$ from the received signal and obtaining the remaining signal $e - A_2 d_2$;

Step S408, applying matched filtering to $e - A_2 d_2$ and obtaining $A_2^H [e - A_2 d_2]$;

Step S409, calculating a matrix H used for the joint detection based on the system matrix $A_1$ corresponding to the useful signal and the weak interference signal, demodulating $A_1^H [e - A_2 d_2]$ with the matrix H, obtaining and outputting the demodulated result.

In the embodiment of the present invention, there is no limitation for the joint detection algorithm to be used. If the algorithm is different, H is different accordingly.

For example, if a linear zero forcing equalization algorithm is used, then $$HH^H = A_1^H A_1$$

If the MMSE equalization algorithm is used, then $$HH^H = A_1^H A_1 + \sigma^2 I$$

The demodulated result is as following:

$(HH^H)^{-1}A_1^H[e-A_2d_2]$

Other equalization algorithms may be used, which will not be elaborated one by one here.

Figure 5:
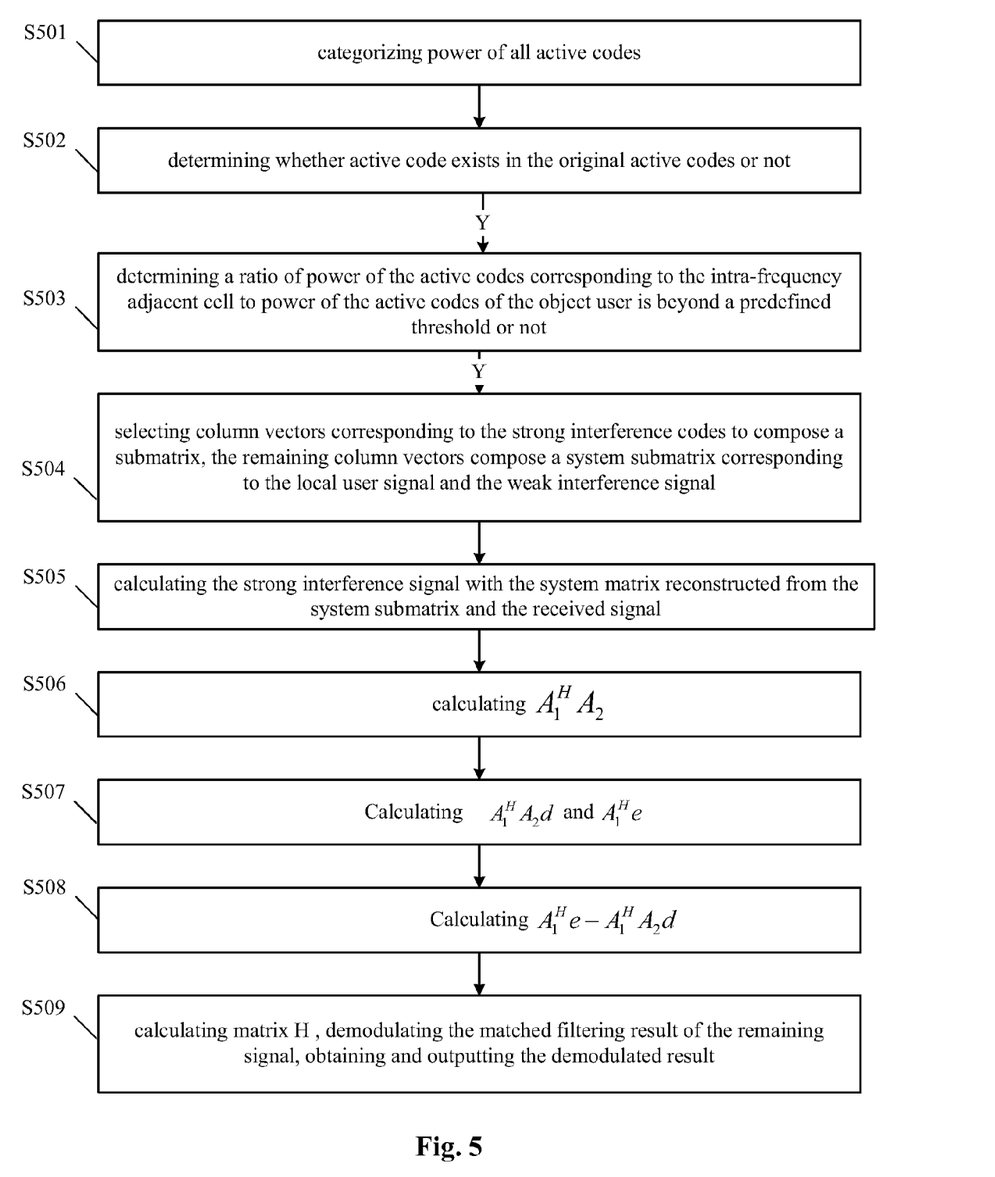
FIG. 5 shows another detail flow chart for calculating a matched filtering result of the remaining signal according to an embodiment of the present invention.

As shown in FIG. 5, in the implementation 2, the joint detection algorithm according an embodiment of the present invention includes the following steps:

Step S501, sequencing power of all active codes by utilizing information on the active windows in the channel estimation;

Step S502, determining whether the active codes corresponding to the intra-frequency adjacent cell exists in the active code list or not, if yes, the second method proceeds to step S503, otherwise, the second method ends and the process proceeds to the existing joint detection procedure;

Step S503, determine whether the ratio of the power of the active codes corresponding to the intra-frequency adjacent cell to the power of the active codes of the local user is beyond a predefined threshold or not, if yes, the strong interference codes exists and the process proceeds to step S504, otherwise the second method ends and the process proceeds to the existing joint detection procedure;

Step S504, determining index of the strong interference code, selecting the column vectors corresponding to the strong interference code to compose the submatrix $B_2$ from the system submatrix B (corresponding to the received signal e). The remaining column vectors compose the system submatrix B1 corresponding to the useful signal and the weak interference signal;

Step S505, calculating the strong interference signal $d_2=Q(A_2^He)$ with the system matrix $A_2$ reconstructed from the system submatrix $B_2$ and the received signal e;

Step S506, calculating $A_1^HA_2$ and $A_1^He$, wherein, $A_1^He$ can be obtained by a direct calculation, or obtained by deleting a part of the matched filtering result of e corresponding to the strong interference signal from the matched filtering result of e, the latter way is more simple;

Step S507, multiplying the correlation matrix $A_1^HA_2$ and the strong interference signal $d_2$, and obtaining $[A_1^HA_2][d_2]$;

Step S508, calculating $A_1^He-[A_1^HA_2][d_2]$; and

Step S509, calculating the matrix H used for the joint detection based on the system matrix $A_1$ corresponding to the useful signal and the weak interference signal, demodulating $A_1^H[e-A_2d_2]$ with the matrix H, obtaining and outputting the demodulated result.

In the embodiment of the present invention, there is no limitation for the joint detection algorithm to be used. If the algorithm is different, H is different accordingly.

For example, a linear zero forcing equalization algorithm is used, then $HH^H=A_1^HA_1$ If the MMSE equalization algorithm is used, then $HH^H=A_1^HA_1+\sigma^2I$ The demodulated result is as following:

$(HH^H)^{-1}A_1^H[e-A_2d_2]$

In any method stated above, it is necessary to obtain $d_2$, and $d_2$ is obtained by a hard decision processing, that is, mapping the software output result $A_2^He$ to the modulated standard constellation. However, it is appreciated that $d_2$ can be directly obtained by any existing soft decision method.

The method and apparatus of DS-CDMA according to the embodiments of the present invention may properly suppress MAI of the strong interference signal based on the existing joint detection algorithm. Especially in the case that strong interference exists in the adjacent cell, the performance of the receiver will be significantly improved.

The method according to the embodiments of the present invention may be implemented by software and/or hardware. Therefore, a processor, such as a general processor or a signal processor, is suitable to be used to implement the joint detection according to the embodiments of the present invention. The processor can load and execute a computer program including program code stored in the computer readable medium to implement the above methods.

In the embodiment of the present invention, a simulation is used to verify the effect of the method. The simulation configuration is as following:

| Communication system | TD-SCDMA |
| --- | --- |
| Number of cells | 3 |
| Midamble number | {19, 58, 85} |
| Modulation scheme | {QPSK, QPSK, QPSK} |
| The number of transmit antenna | 1 |
| The number of receive antenna | 1 |
| Spreading factor | 16 |
| Kcell | 8 |
| The number of time slots | 1 |
| codes number of signal of current cell | 1, 2 |
| codes number of signal in interference cell 1 | 1, 2, 3, 4, 5, 6 |
| codes number of signal in interference cell 2 | 1, 2, 3, 4, 5, 6 |
| ratio of power of a single codes to power of noise in interference cell 1 | 10 dB |
| ratio of power of a single codes to power of noise in interference cell 2 | 4 dB |
| Power of noise | −90 dBm |
| Channel | AWGN |

Figure 6:
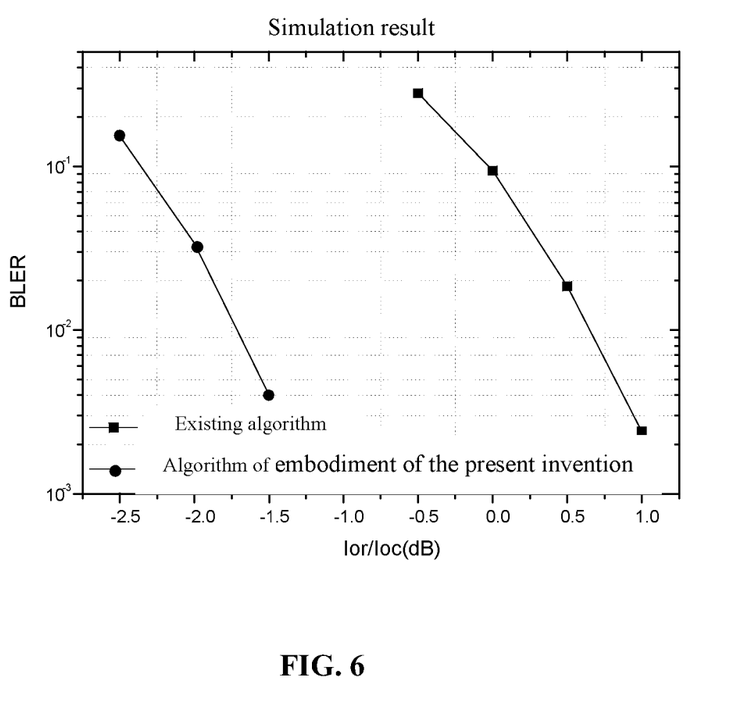
FIG. 6 is a diagram showing the simulation result of the method according to an embodiment of the present invention.

FIG. 6 is a schematics diagram showing the simulation result of the receiver under the simulation configuration. Compared with existing methods, the method according to the embodiment of the present invention improves the performance with about 2.5 dB.

What is claimed is:

1. A joint detection method for a Direct Sequence-Code Division Multiple Access device, the joint detection method comprising:

determining whether a strong interference code corresponding to an intra-frequency adjacent cell of a servicing cell of the device exists in an active code list by determining if a ratio of a first power to a second power is beyond a first threshold, wherein the first power comprises a power corresponding to an interference code, and wherein the second power comprises a power corresponding to an active code of the device;

if the strong interference code exists on the active code list, recovering a strong interference signal corresponding to the strong interference code;

applying an interference cancellation to a received signal by cancelling the strong interference signal from the received signal to obtain a remaining signal;

obtaining a matched filtering result of the remaining signal; and performing a joint detection by utilizing the matched filtering result of the remaining signal to output a demodulated result.

2. The joint detection method according to claim 1, wherein determining whether the strong interference code exists in the active code list comprises:

determining whether an active code corresponding to the intra-frequency adjacent cell exists in the active code list;

if the active code corresponding to the intra-frequency adjacent cell exists in the active code list, determining whether a ratio of a third power to the second power is beyond the first threshold, wherein the third power comprises a power of the active code corresponding to the intra-frequency adjacent cell;

if the ratio of the third power to the second power is beyond the first threshold, determining the active code corresponding to the intra-frequency adjacent cell as the strong interference code.

3. The joint detection method according to claim 2, wherein the power of the active code of the device comprises at least one of:

an average power of all active codes of the device;
a maximum power of all active codes of the device; and
a power of any one of the active codes of the device.

4. The joint detection method according to claim 1, wherein determining whether the strong interference code exists in the active code list comprises:

obtaining a maximum power ($p_{max}$) of all active windows of the device;

calculating a power ratio of a power of each active window corresponding to the intra-frequency adjacent cell to the maximum power ($p_{max}$); and if the first active window having a power ratio larger than a predefined threshold exists in the active windows corresponding to the intra-frequency adjacent cell, determining a code corresponding to a first active window as the strong interference code.

5. The joint detection method according to claim 1, wherein recovering the strong interference signal corresponding to the strong interference codes comprises:

obtaining a matched filtering result of the strong interference signal by selecting a part of a matched filtering result of the received signal corresponding to the strong interference code; and performing a mapping operation on the matched filtering result of the strong interference signal to determine the strong interference signal.

6. The joint detection method according to claim 1, wherein:

applying the interference cancellation to the received signal comprises:

selecting column vectors corresponding to the strong interference code to compose a first system submatrix from a system submatrix corresponding to the received signal, the remaining column vectors composing a second system submatrix corresponding to a useful signal, and a weak interference signal; and cancelling a part of the received signal corresponding to the strong interference signal from the received signal to obtain the remaining signal, wherein the part of the received signal corresponding to the strong interference signal comprises a product of a first system matrix corresponding the first system submatrix and the strong interference signal; and obtaining the matched filtering result of the remaining signal comprises matched filtering the remaining signal with a second system matrix corresponding to the second system submatrix.

7. The joint detection method according to claim 1, wherein:

applying the interference cancellation to the received signal comprises:

selecting column vectors corresponding to the strong interference code to compose a first system submatrix from a system submatrix corresponding to the received signal, the remaining column vectors composing a second system submatrix corresponding to a useful signal, and a weak interference signal; and calculating a product of a conjugate transpose of a second system matrix corresponding to the second system submatrix, the first system matrix corresponding the first system submatrix, and the strong interference signal;

cancelling a part of a matched filtering result of the received signal corresponding to the strong interference signal from a matched filtering result of the received signal to obtain a remaining part; and obtaining the matched filtering result of the remaining signal comprises obtaining the matched filtering result of the remaining signal by subtracting the product from the remaining part.

8. The joint detection method according to claim 1, wherein performing the joint detection comprise performing the joint detection using a linear equalization algorithm.

9. A joint detection apparatus for a Direct Sequence-Code Division Multiple Access device, the joint detection apparatus comprising:

a strong interference code determination unit configured to determine whether a strong interference code corresponding to an intra-frequency adjacent cell of a servicing cell of the device exists in an active code list by determining if a ratio of a first power to a second power is beyond a first threshold, wherein the first power comprises a power corresponding to an interference code, and wherein the second power comprises a power corresponding to an active code of the device;

a signal recover unit configured to recover a strong interference signal corresponding to the strong interference code if the strong interference code exists on the active code list;

an interference cancellation unit configured to:
apply an interference cancellation to a received signal by cancelling the strong interference signal from the received signal to obtain a remaining signal; and
obtain a matched filtering result of the remaining signal; and an equalizer configured to utilize the matched filtering result of the remaining signal to perform a joint detection and to output a demodulated result.

10. The joint detection apparatus according to claim 9, wherein the strong interference code determination unit comprises one or more sub-units configured to:

determine whether an active code corresponding to the intra-frequency adjacent cell exists in the active code list;

determine, if the active code corresponding to the intra-frequency adjacent cell exists in the active code list, whether the ratio of a third power to the second power is beyond the first threshold, wherein the third power comprises a power of the active code corresponding to the intra-frequency adjacent cell; and determine, if the ratio of the third power to the second power is beyond the first threshold, the active code corresponding to the intra-frequency adjacent cell as the strong interference code.

11. The joint detection apparatus according to claim 10, wherein the power of the active code of the device comprises at least one of:

an average power of all active codes of the device;
a maximum power of all active codes of the device; and
a power of any one of the active codes of the device.

12. The joint detection apparatus according to claim 9, wherein the strong interference code determination unit comprises one or more sub-units configured to:
- obtain a maximum power ($p_{max}$) of all active windows of the device;
- calculate a power ratio of a power of each active window corresponding to the intra-frequency adjacent cell to the maximum power ($p_{max}$); and
- if the first active window having a power ratio larger than a predefined threshold exists in the active windows corresponding to the intra-frequency adjacent cell, determine a code corresponding to a first active window as the strong interference code.

13. The joint detection apparatus according to claim 9, wherein the signal recover unit comprise one or more sub-units configured to:
- obtain a matched filtering result of the strong interference signal by selecting a part of a matched filtering result of the received signal corresponding to the strong interference code; and
- perform a map operation on the matched filtering result of the strong interference signal to determine the strong interference signal.

14. The joint detection apparatus according to claim 9, wherein the interference cancellation unit comprises one or more sub-units configured to:
- select column vectors corresponding to the strong interference code to compose a first system submatrix from a system submatrix corresponding to the received signal, the remaining column vectors composing a second system submatrix corresponding to a useful signal, and a weak interference signal;
- cancel a part of the received signal corresponding to the strong interference signal from the received signal to obtain the remaining signal, wherein the part of the received signal corresponding to the strong interference signal comprises a product of a first system matrix corresponding the first system submatrix and the strong interference signal; and
- obtain the matched filtering result of the remaining signal by matched filtering the remaining signal with a second system matrix corresponding to the second system submatrix.

15. The joint detection apparatus according to claim 9, wherein the interference cancellation unit comprises one or more sub-units configured to:
- select column vectors corresponding to the strong interference code to compose a first system submatrix from a system submatrix corresponding to the received signal, the remaining column vectors composing a second system submatrix corresponding to a useful signal, and a weak interference signal;
- calculate a product of a conjugate transpose of a second system matrix corresponding to the second system submatrix, the first system matrix corresponding the first system submatrix and the strong interference signal;
- cancel a part of a matched filtering result of the received signal corresponding to the strong interference signal from a matched filtering result of the received signal to obtain a remaining part; and
- obtain the matched filtering result of the remaining signal by subtracting the product from the remaining part.

16. The joint detection apparatus according to claim 9, wherein the equalizer utilizes a linear equalization algorithm for the joint detection.

17. A receiver used in a Direct Sequence-Code Division Multiple Access device, the receiver comprising a joint detection apparatus, the joint detection apparatus comprising:
- a strong interference code determination unit configured to determine whether a strong interference code corresponding to an intra-frequency adjacent cell of a servicing cell of an device exists in an active code list by determining if a ratio of a first power to a second power is beyond a first threshold, wherein the first power comprises a power corresponding to a strong interference code, and wherein the second power comprises a power corresponding to an active code of the device;
- a signal recover unit configured to recover a strong interference signal corresponding to the strong interference code if the strong interference code exists on the active code list;
- an interference cancellation unit configured to:
  apply an interference cancellation to a received signal by cancelling the strong interference signal from the received signal to obtain a remaining signal; and
  obtain a matched filtering result of the remaining signal; and
- an equalizer configured to utilize the matched filtering result of the remaining signal to perform a joint detection and to output a demodulated result.

18. A computer program product stored in a non-transitory computer readable medium for controlling a processor in a Direct Sequence-Code Division Multiple Access device, the computer program produce comprising software instructions which, when run on the processor, causes the Direct Sequence-Code Division Multiple Access device to:
- determine whether a strong interference code corresponding to an intra-frequency adjacent cell of a servicing cell of the device exists in an active code list by determining if a ratio of a first power to a second power is beyond a first threshold, wherein the first power comprises a power corresponding to an interference code, and wherein the second power comprises a power corresponding to an active code of the device;
- if the strong interference code exists on the active code list, recover a strong interference signal corresponding to the strong interference code;
- apply an interference cancellation to a received signal by cancelling the strong interference signal from the received signal to obtain a remaining signal;
- obtain a matched filtering result of the remaining signal; and
- perform a joint detection by utilizing the matched filtering result of the remaining signal to output a demodulated result.

* * * * *